United States Patent [19]

Chambers et al.

[11] 4,218,728
[45] Aug. 19, 1980

[54] POLYPHASE HYBRID RECTIFYING BRIDGE WITH COMMUTATION FAULT PROTECTION

[75] Inventors: George S. Chambers, Daleville; Carter Sinclair, Waynesboro, both of Va.

[73] Assignee: General Electric Company, Salem, Va.

[21] Appl. No.: 970,428

[22] Filed: Dec. 18, 1978

[51] Int. Cl.² .......................................... H02H 7/125
[52] U.S. Cl. ........................................ 363/54; 363/87; 363/129
[58] Field of Search .................... 363/51–54, 363/85–88, 128–129; 318/345 C, 434, 506

[56] References Cited

U.S. PATENT DOCUMENTS

| | | | |
|---|---|---|---|
| 3,746,966 | 7/1973 | Torok et al. | 363/87 |
| 3,771,041 | 11/1973 | Chadwick | 363/87 X |
| 3,848,175 | 11/1974 | Demarest | 363/54 X |
| 3,883,791 | 5/1975 | Zelina et al. | 363/87 |
| 3,922,595 | 11/1975 | Vieri | 363/54 |
| 4,063,146 | 12/1977 | Oliver | 363/87 X |

*Primary Examiner*—J. D. Miller
*Assistant Examiner*—Peter S. Wong

*Attorney, Agent, or Firm*—Arnold E. Renner

[57] ABSTRACT

In association with a polyphase hybrid rectifying bridge having controlled rectifiers, there is employed, in addition to the normal means for controlling the firing time of the controlled rectifiers, additional circuitry for preventing or at least reducing the probability of the occurrence of a commutation fault. This is achieved by first producing a timing signal which is representative of the time intervals during which a voltage exists across a load being supplied by the bridge and by then combining the timing signal with a basic reference signal representing a minimum time period during which this voltage should exist to guard against a commutation failure of the controlled rectifiers. When a prescribed relationship exists between the timing signal and the basic reference signal, the normal control means is overridden and the firing angle of the controlled rectifiers is advanced to a point which will guarantee commutation.

In addition, there is further provided an optional feature which facilitates recovery of the bridge in the event a commutation failure does occur. This feature takes the form of a recovery circuit which, in response to a sensing of an unbalance in the alternating voltage supplying the bridge, outputs a signal which also causes an advance in the firing angle of the controlled rectifiers.

8 Claims, 4 Drawing Figures

POLYPHASE HYBRID RECTIFYING BRIDGE WITH COMMUTATION FAULT PROTECTION

BACKGROUND OF THE INVENTION

The present invention relates generally to the operation of rectifier bridges and more specifically to a scheme for the prevention of or guarding against commutation faults, particularly those which are occasioned by a too rapid retardation in the normal firing angle of the controlled rectifiers.

In any polyphase rectifier system, each phase carries all of the current for a portion of the time. For example, in a three phase circuit, each phase carries all the current for one-third of the time. With diodes, transfer or commutation from phase to phase is automatically achieved by the next phase having a greater instantaneous voltage than the phase which is then carrying current. When controlled rectifiers, such as thyristors (e.g., silicon controlled rectifiers) are used, however, the load voltage is controlled by delaying the transfer of current between the phases. This is commonly known as phase control. While phase control is a proven and effective method of controlling the load voltage, care must be taken in order that the voltage-time relationships are sufficient to allow the commutation or transfer so that a commutation failure resulting in an undesirable condition does not occur.

When the alternating current (a.c.) source supplying the rectifier bridge has significant inductance, the transfer of the current or the commutation from phase to phase takes both voltage and time. There must be sufficient volt-seconds available to force the current off in one phase and to bring it up in the next phase. For any particular source, the volt-seconds required are a function of the current to be commutated and not the point at which transfer is initiated. A typical system may require, for example, forty-five electrical degrees to achieve commutation at full phase conduction.

When the rectifiers are driving a highly inductive load, such as a generator field having a time constant measured in seconds, the current to be transferred immediately following a sudden output voltage reduction is the same as it was prior to the sudden reduction and the volt-seconds required for commutation are the same. If the initiation of transfer is delayed too long by the controlled rectifiers, the remaining volt-seconds available may be insufficient to complete the transfer and a commutation failure will result. Similarly, when the bridge is used to drive a highly inductive load such as a motor load, if the demand on the motor is suddenly reduced such that the normal control governing the firing of the rectifiers is phased back or retarded very rapidly, the same situation concerning the available volt-seconds and the current could exist.

As the load current decreases in response to the lower voltage requirement, fewer volt-seconds are required to complete the current transfer and the firing of the rectifier, the initiation of current transfer, may be further delayed without resulting in an improper operation.

One early method of operation of the bridges to insure proper commutation was to place what is commonly known as a free-wheeling diode across or in parallel with the load. This was a satisfactory solution for the technology of the past since the semiconductors then used could not be operated at high current densities for thermal reasons. As such, the forward voltage drop at maximum current was close enough to the voltage drop at the current level where the controlled rectifier could gain control such that a diode placed in parallel with the two series connected cells of the bridge would divert the load current and allow the controlled rectifiers of the bridge to regain control. With modern semiconductors, operation at a much higher current density is quite common and this is no longer true. In the present situation, if a bridge having a free-wheeling diode is suddenly phased back from full rated current to some very low desired value, the free-wheeling diode will have too large a forward voltage drop to divert all the current and the current will divide between the free-wheeling path and the bridge path such that the current through the bridge path will be more than enough to keep the controlled rectifier (the bridge path) conductive. Thus, a commutation failure will result.

SUMMARY OF THE INVENTION

It is, therefore, an object of the present invention to provide an improved polyphase hybrid rectifier bridge system.

It is another object to provide an improved circuit for use with a polyphase hybrid rectifying bridge for the prevention of or guarding against commutation faults.

It is a further object of the invention to provide, in a polyphase hybrid rectifying bridge system, suitable circuitry to guard against the occurrence of commutation faults particularly those caused by too rapid a reduction in the required controlled rectifier firing angle.

It is a still further object to provide, in a polyphase hybrid rectifying bridge system, circuitry to guard against the occurrence of commutation faults by limiting the minimum firing angle as a function of the intervals during which a voltage exists across the load.

It is still another object to provide, in a polyphase hybrid rectifying bridge system, circuitry to guard against the occurrence of commutation faults by limiting the minimum firing angle as a function of the intervals during which a voltage exists across the load and further including recovery circuitry acting, in conjunction with the earlier defined circuitry, to initiate recovery of the system in the event a commutation failure does occur.

It is a further object of the invention to provide, in a polyphase hybrid rectifying bridge system, wider range of output voltage control than possible when using a conventional fixed phase-back limit set to allow at all times for the maximum commutation time by replacing the fixed limit with an automatically varying limit which allows additional retard of the firing pulses as the actual commutation time decreases.

The foregoing and other objects are satisfied in accordance with the present invention through the recognition of the fact that, in a polyphase hybrid rectifying bridge supplying a load, the minimum phase angle at which the controlled rectifiers of the bridge can be fired is a function of the extant voltage across the load. As such, the present invention includes, in association with a polyphase hybrid rectifying bridge having controlled rectifiers and the normal means for controlling the firing time or angle of the rectifiers, additional circuitry for guarding against the occurrence of a commutation fault. This circuitry includes means to sense the voltage across the load and to provide a timing signal proportional or representative thereof. Also included are means to provide a basic reference signal representing a minimum time period during which voltage should exist across the load in order to prevent the commutation failure. These two signals are combined and, in response to a predetermined relationship therebetween, the normal control means is overriden and the firing angle of the controlled rectifiers is advanced to prevent a commutation failure.

In the preferred embodiment there is additionally provided means to facilitate the recovery of the bridge if a commutation failure does actually occur. This means is in the form of a recovery circuitry which is responsive to a sensing of an unbalance in the alternating voltage supplying the bridge which, in turn, is indicative of the fact that the circuit is in an unstable mode such as by "single phasing". In response to the sensing of this condition, the recovery circuit outputs a signal which also causes an advance in the firing angle of the controlled rectifiers to force the system into a recovery mode of operation.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
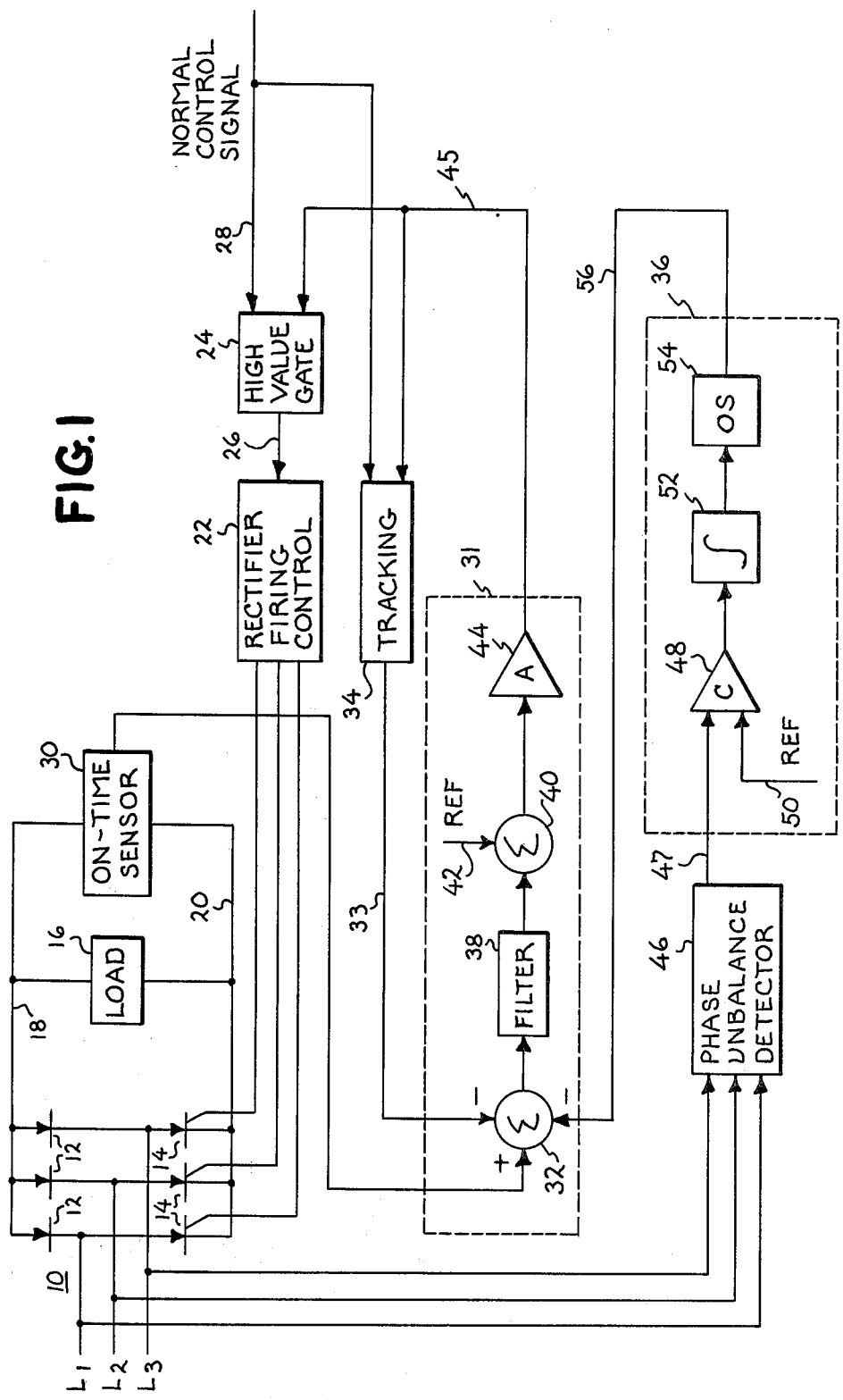
FIG. 1 is a block diagram illustrating the present invention in its preferred embodiment.

Referring now to FIG. 1 which shows the present invention in its preferred embodiment, there is shown a three phase rectifying bridge 10 which is comprised of three diodes 12 and three controlled rectifiers 14 which receive a.c. power by way of lines $L_1$, $L_2$ and $L_3$ and supply direct current (d.c.) power to a load 16 by way of lines 18 and 20. As is well known, by controlling the firing times or the firing angles of the controlled rectifiers 14 the amount of power that is delivered to the load 16 may be controlled. Control of the firing of the thyristors or controlled rectifiers 14 is a function of a rectifier firing control 22 which may be any of those well known in the art. In the embodiment shown in FIG. 1, the output of control 22 is a function of the output of a high value gate 24 as delivered by line 26. Perhaps the most common implementation of this control is that the signal input to firing control 22 would be an analog voltage signal. The outputs of the control 22 to the gates of the controlled rectifiers 14 are gating signals having a time relationship, with respect to the a.c. input wave which is a function of the magnitude of the input signal (line 26). As such, by varying the time of rendering the rectifiers conductive, the amount of voltage supplied to the load 16 can be varied. The input to control 22 from the high value gate 24 is, under ordinary operating circumstances, a function of a "normal control signal" which is furnished to gate 24 on line 28. This signal is, preferably, an analog voltage signal which has a magnitude representative of the desired level of operation of the bridge. Whether this signal is derived from some form of device such as a potentiometer which is hand adjusted, or the result of some more complex system responding to some operating system parameter is of no consequence to the present invention.

As earlier indicated, the present invention utilizes a signal proportional to the time during which the voltage exists across the load in combination with a reference signal to alter the operation of the rectifier bridge 10. To this end, there is provided an on-time sensor 30 which provides an output signal serving as one input to a summing junction 32 of a comparison circuit indicated generally within the dashed line block 31. The summing junction also receives signals from a tracking block 34 on line 33 and by way of a line 56 from a recovery circuit 36. For the moment, however, these latter two signals will be ignored so that the basic concept of the invention may be better understood. Ignoring the signals from blocks 34 and 36, the on-time sensor 30 will output a signal which is, essentially, a series of pulses corresponding in width to the time during which a voltage exists across the load 16. As will be better understood with respect to the more detailed description which follows, the pulses which appear from the sensor 30 at the summing junction 32 are preferably square wave pulses having a fixed amplitude and a width proportional to the time during which the voltage exists across the load. The output of junction 32 is applied to the filter 38 which in turn outputs a signal to the summing junction 40. The signal from filter 38 is, essentially, a d.c. analog signal having a magnitude proportional to the width of the signals applied to summing junction 32. A reference signal (line 42) forms a second input to summing junction 40. The two signals applied to the summing junction 40 would normally be of opposite relative polarity. Thus, the output of summing junction 40 is the algebraic sum of these two signals and this output serves as an input to a suitable gain amplifier 44 the output of which is applied by way of line 45 to the high value gate 24. The high value gate 24, as previously indicated, outputs the signal on line 26 to control the rectifier firing control 22 to thereby control the power supplied to the load.

The description thus far outlines the basic present invention. Under normal circumstances the value of the signal on line 28 will be higher than that on line 45 and will by way of the high value gate 24 control the operation of the rectifying bridge circuit. When, however, the time periods during which the voltage existing across the load becomes too small to assure commutation, the output of the on-time sensor 30, as applied to the comparison circuit 31, will result in a higher value signal on line 45 such that the latter signal will be the one passed by the high value gate to thus control the rectifiers 14 of the bridge 10 at a firing angle sufficient to insure commutation. Conversely, if under the operation of the normal control signal on line 28 the bridge were running at a relatively high level, the feedback circuitry by way of the on-time sensor 30 and the comparison circuit 31 would result in a relatively smaller value on line 45 such that the normal control signal would be controlling.

By way of further operational explanation, if while operating at a normal high level the load requirement were suddenly reduced, there would still exist, because of the nature of the bridge, its source and its load, a large load current which the lower firing angle specified by the reduced normal control signal would be insufficient to insure commutation. However, due to the feedback circuit of the present invention, the value of the signal on line 45 would be at a higher value than that on line 28 and this higher signal would maintain the firing of the rectifiers at some higher value. As the load current is reduced, the value of the signal on line 45 will gradually reduce allowing a reduction in the firing angle of the control rectifiers 14 until such time as the normal control signal 28 once again takes control of the overall operation.

Earlier mention was made of the tracking function of block 34. In the actual implementation of the present invention, filter 38 was basically an RC circuit having a relatively long time constant. As such, response time was not as rapid as desired and thus the tracking feature was included. Tracking block 34 consists, essentially, of a differential amplifier which receives inputs from both the normal control signal line 28 and the line 45. Tracking block 34 outputs a signal to summing junction 32 which will normally be of an opposite polarity as that provided from the on-time sensor 34. Thus, the signal on line 33 tends to keep summing junction 32 at a value such that only small changes are required to change the output thereof so that the filter 38 may respond more quickly to any change. It is recognized that this feature performs no essential part of the present invention and that if components of sufficiently fast reaction time were included, this could be omitted entirely.

The foregoing basic system of the instant invention performs satisfactorily in most instances but, like many electrical circuits is subject to occasioned malfunction, for example those as might result from unsuppressed transients which are too fleeting for the response time of the overall circuit. When commutation failure does occur, the system enters into which is known as "single phasing" in which only one phase of a.c. is applied to the load. When this particular situation does occur, the average voltage across the load is higher than that which would normally exist and the on-time sensor signal will not be effective as a corrective measure. To guard against this occurrence, the recovery circuit shown at the bottom of FIG. 1 within the dashed lined block 36 was incorporated into the preferred embodiment of the present invention. The recovery circuit 36 receives an input from a phase unbalance detector 46 which is connected to the three a.c. lines $L_1$, $L_2$ and $L_3$. Detector 46 provides an output whenever there is an unbalance between the voltages on these three lines. This output is applied as one input of a comparator amplifier 48, within the recovery circuit 36, the second input to which is a reference voltage 50. When the unbalance is of sufficient magnitude as determined by the reference 50, there is an output from comparator 48 which is applied to an integrating amplifier 52. Amplifier 52 acts as a transient suppressor and has an output which is supplied to a monostable multivibrator or one-shot 54. The output of one-shot 54 is a pulse which is applied by way of line 56 to the summing junction 32. This signal is of opposite polarity to that received from the on-time sensor 30 and of sufficient magnitude to force a high value signal on line 45 and henceforth the firing of the controlled rectifiers 14 of the bridge 10.

Figure 2:
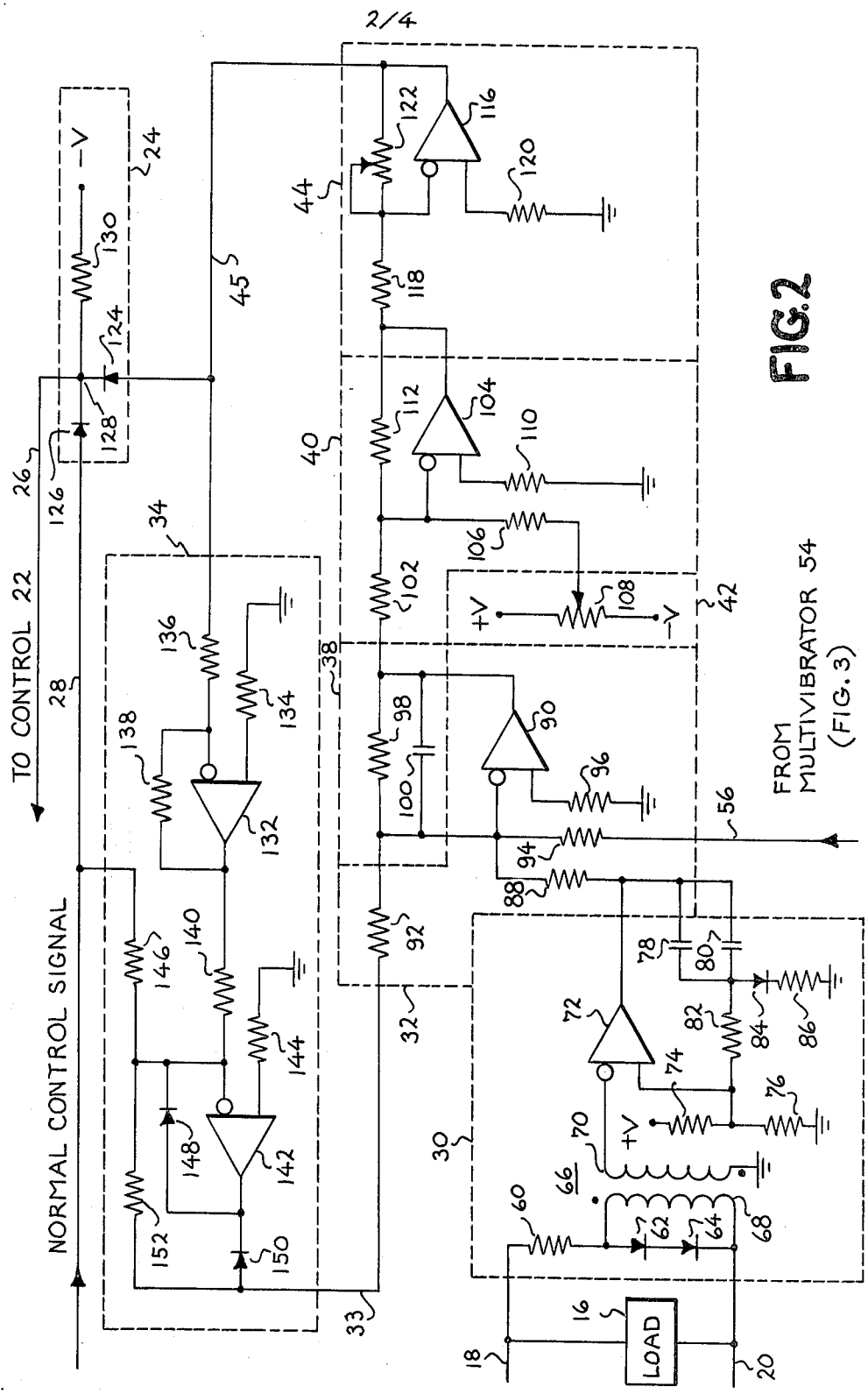
FIGS. 2 and 3 are detailed schematic diagrams illustrating one way of implementing the present invention as is illustrated in block form in FIG. 1; and, FIG. 4 is a timing diagram useful in understanding the operation of the present invention.
Figure 3:
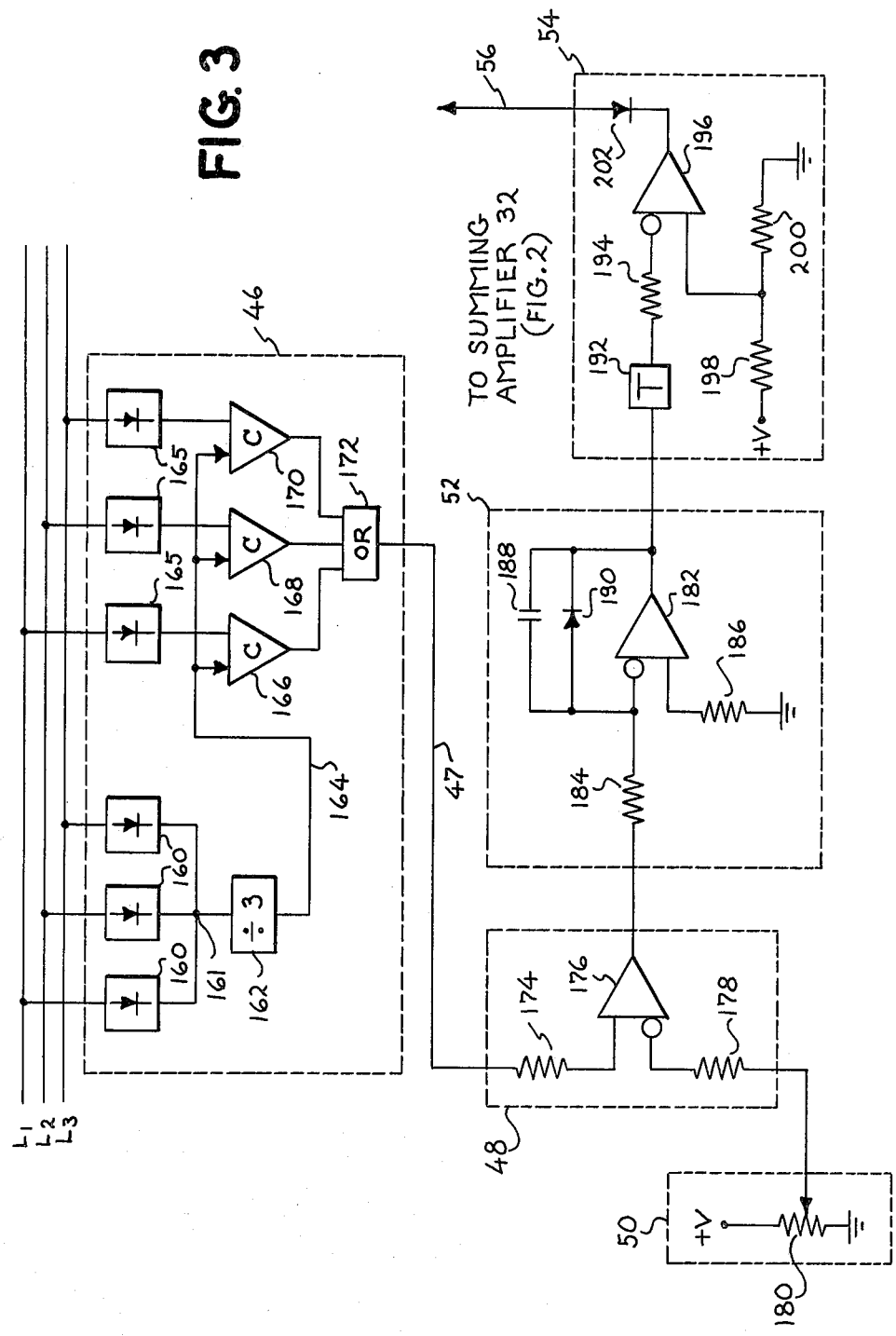

FIGS. 2 and 3, show in detail the preferred detailed implementation of the present invention illustrated in block form in FIG. 1. In FIG. 2, the load 16 is once again shown as connected between the buses 18 and 20. In parallel with the load 16 is the on-time sensor 30. On-time sensor 30 includes a series combination having a resistor 60 and a pair of diodes 62 and 64 connected in parallel with the load. In parallel with the diodes 62 and 64 is connected the primary 68 of a pulse transformer shown generally at 66. Referencing for a moment FIG. 4, line A depicts the voltage which may exist across the load in a phase retarded situation. This voltage has a sharply rising front edge and a declining trailing edge which follows a generally sinusoidal shape. Pulse transformer 66 further includes a secondary winding 70 which has one end connected to ground and with the other end connected to the inverting input of an operational amplifier 72. The noninverting input of amplifier 72 is provided with a bias voltage, shown as being derived from the mid-point of a voltage divider comprising resistors 74 and 76 connected between the source of positive potential (+V) and ground. The output of amplifier 72 is connected by way of a feedback path to the noninverting input. This feedback path includes a pair of parallel connected capacitors 78 and 80 which combination is in series with a feedback resistor 82. The junction of the resistor 82 and the capacitors 78 and 80 is connected to ground by way of a diode 84 and a resistor 86.

Amplifier 72 and its associated components form a monostable multivibrator. With no voltage applied to the inverting input of the amplifier, its output is at positive saturation due to the positive bias applied to the noninverting input. When a voltage appears across the load such as, for example, that shown in line A of FIG. 4, the resulting negative pulse from the transformer secondary 70 (see line B of FIG. 4) does not change the state of the amplifier 72. However, when the voltage is removed from the load, the resulting positive pulse drives amplifier 72 into negative saturation. If there were no further pulses from the transformer 66, amplifier 72 would stay in negative saturation until capacitors 78 and 80 discharge sufficiently for the noninverting input to go positive. However, since additional pulses from the transformer 66 do occur which will temporarily drive the output of amplifier 72 into positive saturation and then back to negative saturation when voltage is again removed from the load, the output of amplifier 72 is a series of rectangular pulses as shown by line C of FIG. 4.

Figure 4:
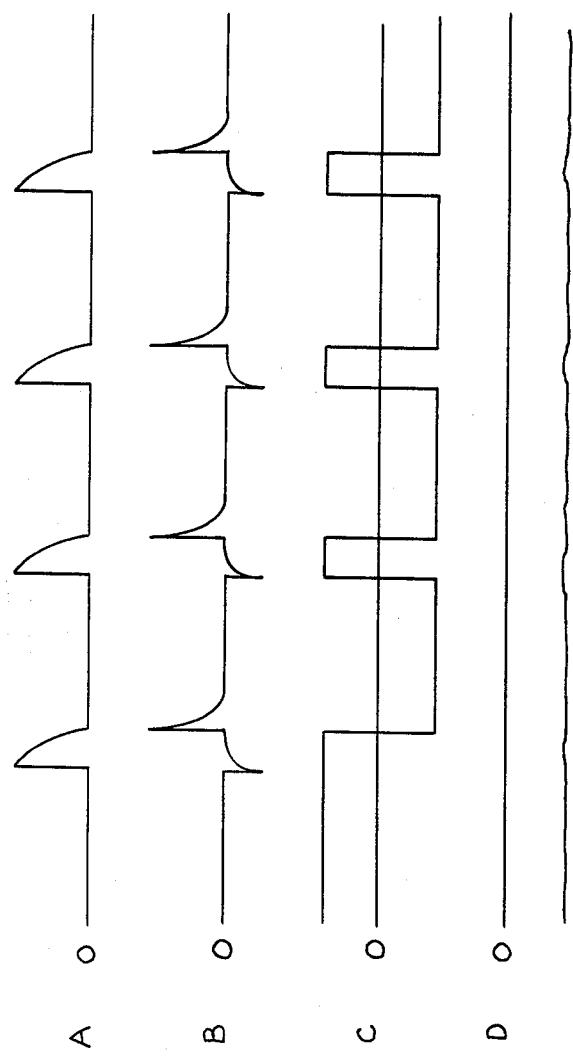

The output of amplifier 72 is applied by way of an input resistor 88 to the inverting input of a summing and filter operational amplifier 90. The inverting input of the amplifier 90 receives as a further input, through input resistor 92, the signal on line 33 from the tracking system 34. A further input exists by way of input resistor 94 and line 56 from the output of the multivibrator 54 of the recovery circuit 36 (see FIG. 3). The noninverting input to amplifier 90 is connected by way of resistor 96 to ground. Ignoring, for the moment, the inputs by way of resistors 92 and 94, the output of amplifier 90 will be at a large negative value or negative saturation with a continuous load voltage and will be a large positive value or positive saturation when there was low average voltage across the load. The pulse output of amplifier 72 is averaged by amplifier 90 and filter 38 which is connected between the output of amplifier 90 and its inverting input. Filter 38 consists of a parallel combination of a resistor 98 and a capacitor 100 such that the output of the filter 38 is, essentially, an inverted d.c. level signal as shown by line D (FIG. 4).

The output of filter 38 is furnished via an input resistor 102 to the inverting input of a summing operational amplifier 104. This same input is also connected by way of a resistor 106 to the wiper arm of a potentiometer 108 (reference 42) which is connected between a positive voltage (+V) and a negative voltage (−V). The noninverting input of amplifier 104 is connected by way of a resistor 110 to ground. A feedback path including a resistor 112 is provided between the output of the amplifier 104 and its inverting input. The reference signal from 42 and the feedback signal by way of resistor 102 are summed and inverted by the amplifier 104 and this output is applied to the amplifier 44 which provides appropriate gain to provide an output signal on line 45. Amplifier 44 includes a simple operational amplifier 116 which receives the output of amplifier 104 at its inverting input by way of a resistor 118. The noninverting input is connected to ground by way of a resistor 120. The output of amplifier 116 is connected to its inverting input through a feedback path including a variable resistor 122 which enables the gain of the amplifier to be varied.

The output on line 45 serves as one input to the high value gate 24 which consists of a pair of diodes 124 and 126 connected to a common junction 128 which is also connected to a source of negative voltage ($-V$) by way of a resistor 130. As is known in the art, the high value gate will pass the voltage of higher magnitude. In the present embodiment, line 45 is connected to the anode of diode 124 while the normal control signal by way of line 28 is connected to the anode of the diode 126. The signal which appears on line 26, the output of the high value gate 24, is the higher of the two signals applied to the two diodes 124 and 126 and this signal is applied to the control 22 as explained with respect to FIG. 1.

As earlier mentioned, the relatively long time constant of the filter 38, and its associated amplifier circuit 32, does not permit the system to respond as rapidly to changes as can be demanded by the normal control signal on line 28. As such, a very fast reduction in the normal control signal could retard the phase bridge rectifiers to a point of commutation failure before the output of amplifier 90 could change sufficiently to drive the signal on line 45 to its takeover point. This problem is corrected, as previously indicated, by the inclusion of the tracking system 34 which provides for holding the output of amplifier 116 (block 44) at a value slightly more negative than the normal control signal for normal operating conditions. This is achieved by the signal on line 33 which biases the output of amplifier 90 to a value nearly equal to that of the reference voltage from block 42.

Still referencing FIG. 2, the tracking function is achieved by the tracking circuit 34 which includes a first operational amplifier 132 which has its noninverting input connected to ground by way of a resistor 134 and its inverting input connected to receive the signal on line 45 by way of a resistor 136. A feedback resistor 138 is connected between its output and its inverting input. The output of amplifier 132 is applied by way of a resistor 140 to the inverting input of an operational amplifier 142 which has its noninverting input connected to ground by way of resistor 144. A second input to the inverting input of amplifier 142 is the normal control signal on line 28 which is applied via resistor 146. A diode 148 poled with its anode connected to the output of amplifier 142 is connected between that output and the inverting input. A second diode 150, poled to pass negative signals from the amplifier 142, is connected to the amplifier output and the line 33 is connected to the anode of that diode. A further feedback path is provided from the anode of diode 150 to the inverting input of amplifier 142 and includes a resistor 152. As such, the normal control signal on line 28 is fed through amplifier 142 and summed with the signal which is the output of amplifier 132. The output of amplifier 132 is, in turn, the inversion of the signal on line 45. This algebraic sum (difference) is amplified by amplifier 142. If the signal on line 45 is less than the normal control signal, the output of amplifier 142 is negative. This negative signal, when applied to amplifier 90 by way of resistor 92 brings the output of resistor 116 up to a value just slightly less than the normal control signal. If the output on line 45 is greater than the normal control signal (line 28), as is the case when the minimum on-time regulator is in control, the output of amplifier 142 is a positive diode drop above ground and is, therefore, disconnected from amplifier 90 by way of diode 150. Thus, the tracking circuit 34 maintains the circuitry of the basic invention at a point ready to respond to the changes in the overall control.

As discussed with respect to FIG. 1, due to transient conditions it is possible that commutation failure could occur with the circuit thus far described. Therefore, the recovery circuit shown in detail in FIG. 3 is included. Referencing now FIG. 3, the phase unbalance detector 46, which can be of any suitable type, provides a signal on line 164 which is proportional to the average of the three phase voltages on lines $L_1$, $L_2$ and $L_3$. This is achieved, in the illustrated embodiment, by providing three rectifying circuits 160 each connected to one of the phase voltage lines such that the outputs of these three rectifying circuits are summed at a junction 161. Junction 161 is connected to a common divide-by-three circuit 162 so that the output signal on line 164 has a value proportional to the average phase voltage. This signal forms one input to each of three comparator circuits 166, 168 and 170. The other inputs to the three comparators are, respectively, the outputs of three additional rectifying circuits 165 which receive inputs from the three phase voltages; that is, from lines $L_1$, $L_2$ and $L_3$. The outputs of the three comparators 166, 168 and 170 are connected to an OR gate 172 such that there appears at the output of OR gate 172 a voltage or a signal whenever there is an unbalance in the line voltages. (It is to be expressly understood that this particular unbalance detector is shown merely for purposes of example and that other forms could be used.)

The output of the phase unbalance detector 46 (line 47) is applied by way of an input resistor 174 to the noninverting input of an amplifier 176 within the comparison circuit 48. The inverting input of amplifier 176 is connected by way of a resistor 178 to the reference 50 which may be comprised of a simple potentiometer 180 connected between a source of positive potential ($+V$) and ground. The output of the comparator 48 serves as an input to the integrator 52. Integrator 52 includes an operational amplifier 182 having an inverting input to which the output of the comparator 48 is applied by way of a resistor 184. The noninverting input of amplifier 182 is connected by way of a resistor 186 to ground. The parallel combination of a capacitor 188 and a diode 190 serves as a feedback path between the output of the amplifier 182 and its inverting input. Diode 190 is poled such that its cathode is connected to the output of the amplifier 182. This integrator, as earlier indicated, serves to suppress transients.

Multivibrator 54 receives the output of integrator 52 and includes a timing circuit 192 which, in the embodiment of the invention implemented was an integrated chip designated as a Signetics 555 linear integrated timing circuit (Signetics Corporation, 811 East Arques Avenue, Sunnyvale, California 94086). This circuit merely performs a standard timing function. The output of the timer 192 is applied by way of a resistor 194 to the inverting input of an operational amplifier 196 which has its noninverting input connected to a positive bias represented by the voltage divider including resistors 198 and 200 connected between a source of positive potential and ground. The output of the amplifier 196 is applied by way of a diode 202, poled to pass only negative pulses, and forms the output 56 which, with respect to FIG. 2, is shown as applied to the amplifier 90 by way of resistor 94.

As a brief functional description of the recovery circuit, an unbalance in the line voltages is sensed and a d.c. voltage proportional to the unbalance is fed to the comparison circuit 48 to be compared to the reference. The output of the comparator is at negative saturation for normal conditions and positive saturation for commutation failure. The integrator 52 is at positive saturation under normal conditions and integrates downward when a commutation failure occurs. When the output of amplifier 182 falls to some predetermined value, the monostable multivibrator 54 is triggered. The output of amplifier 196 is normally high and disconnected from the amplifier 90 of FIG. 2 by way of the diode 202. Upon commutation failure and after expiration of the time delay occasioned by the timer 192, the positive pulse from the timer 192 which is inverted by amplifier 196 feeds a negative pulse or restart signal through the diode 202 and by way of resistor 94 (FIG. 2) to the inverting input of the amplifier 90 of FIG. 2. This signal will force the amplifier 90 to output a positive signal and restore normal commutation and the basic circuit shown in FIG. 2 will then return to normal operation. The short period of time which the bridge 10 is phased to full on will have no significant effect upon the load particularly if the load is inductive as was assumed in the present instance.

From the foregoing it is seen there has been provided a relatively simple and easily implemented circuit which prevents or at least guards against the commutation failure of the controlled rectifiers of a polyphase rectification bridge and which further provides for system recovery in the event of failure. While there has been shown and described what is at present considered to be the preferred embodiment of the present invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. For use with a polyphase rectifying bridge supplying a load, said bridge including controlled rectifiers, a circuit for preventing commutation failure of the controlled rectifiers comprising:
    (a) means to sense time periods during which a voltage exists across said load and to develop a time signal proportional thereto;
    (b) means to provide a reference signal proportional to a minimum period of time during which voltage should exist across said load in order to prevent commutation failure; and,
    (c) means to compare said time signal and said reference signal and to produce an output signal in response to a prescribed relationship therebetween, said control signal selectively serving to override a normal control signal acting to govern the operation of the controlled rectifiers of said bridge to thereby increase their conduction time.

2. A circuit for use with a polyphase rectifying bridge having uncontrolled and controlled rectifiers, the latter acting to vary the power supplied to a load connected to the bridge under the control of firing means operable to vary the firing angle, said circuit comprising:
    (a) means to determine the time periods during which a voltage exists across a load and to provide an output signal proportional thereto;
    (b) means to provide a reference signal proportional to a prescribed minimum period of time during which a voltage should exist across the load in order to assure proper commutation of the controlled rectifiers; and,
    (c) means responsive to said output signal and said reference signal to develop an override signal for selective application to the firing means to advance the times at which said controlled rectifiers are rendered conductive.

3. For use with a polyphase rectifying bridge system comprising both diodes and controlled rectifiers, said system further including a firing control circuit for providing gating signals to the controlled rectifiers to thereby control the power supplied to a load, circuit means for preventing controlled rectifier commutation failure resulting from retardation of the firing angle comprising:
    (a) means for developing a timing signal indicative of the time periods during which a voltage exists across the load;
    (b) means to provide a reference signal proportional to the minimum amount of time during which load voltage should exist to assure proper commutation of said bridge controlled rectifier;
    (c) means responsive to a prescribed relationship of said timing signal and said reference signal to output a control signal; and,
    (d) means for selectively applying said control signal to the firing control circuit whereby said circuit forces an earlier than normal firing of the controlled rectifiers of the bridge.

4. A power conversion system for supplying a load with direct current power from a polyphase alternating current source comprising:
    (a) hybrid bridge rectifier including an uncontrolled and a controlled rectifier for connecting each phase of said source to said load;
    (b) means for supplying gate signals to said controlled rectifiers to govern the conduction time thereof to thereby control the amount of power furnished to said load; and,
    (c) means for preventing the commutation failure of the controlled rectifiers of the bridge as a result of too rapid a reduction in the firing angle comprising:
        (1) means to develop a timing signal proportional to the time during which a voltage appears across the load,
        (2) means to develop a base reference signal proportional to a determined minimum time during which a voltage should appear across the load, and,
        (3) means to combine said timing signal and said base reference signal to develop, in response to a prescribed relationship therebetween, an overriding control signal selectively operative to advance the firing time of said controlled rectifiers.

5. The invention in accordance with claim 4 wherein said reference signal is a direct current level.

6. The invention in accordance with claim 5 wherein said means to develop said timing signal includes:
   (a) a transformer coupled to the load voltage and operative to provide a signal representative thereof;
   (b) a comparison circuit for receiving the signal from said transformer and for providing in response thereto an output comprising a series of pulses at substantially constant magnitude and of widths proportional to the time periods during which a voltage exists across said load; and,
   (c) circuit means for receiving said pulses and for producing a substantially direct current level signal proportional to the width of said pulses.

7. The invention in accordance with claim 4 further including recovery means for effecting recovery of the system in the event a commutation failure does occur, said recovery means including:
   (a) means to detect an unbalance in the alternating phase voltages supplying said bridge to develop a signal proportional to any unbalance;
   (b) means to provide a voltage reference signal proportional to a predetermined magnitude representing a maximum permissible unbalance;
   (c) means to compare said voltage reference signal and said unbalance signal and to provide a restart signal when the latter exceeds the former; and,
   (d) means to apply said restart signal as a further input to said means to combine said timing signal and said base reference signal to thereby vary the value of said overriding control signals to assure commutation of said controlled rectifiers.

8. The invention in accordance with claim 7 further including:
   (a) transient suppression integrating means for receiving the output of said means to compare said reference signal and said unbalance signal; and,
   (b) a monostable multivibrator for providing an output pulse of defined width, said output pulse serving as said restart signal.

* * * * *